US006269260B1

United States Patent
Shin et al.

(10) Patent No.: US 6,269,260 B1
(45) Date of Patent: Jul. 31, 2001

(54) MOBILE TELEPHONE HAVING A CHARACTER RECOGNITION FEATURE AND METHOD FOR CONTROLLING THE SAME

(75) Inventors: Jang-Ki Shin, Kyonggi-do; Joung-Kyou Park, Suwon, both of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/336,952

(22) Filed: Jun. 21, 1999

(51) Int. Cl.[7] .................................................. H04B 1/38
(52) U.S. Cl. .................... 455/575; 455/414; 455/425; 455/460; 455/461; 341/22; 341/26
(58) Field of Search ..................... 455/566, 575, 455/418, 564, 414, 425, 460, 461, 514, 550, 551, 556; 329/355, 356; 345/161; 341/22, 26

(56) References Cited

U.S. PATENT DOCUMENTS 5,062,070 * 10/1991 Lapeyre ............................ 708/146
5,128,672 * 7/1992 Kaehler ............................. 341/23
5,382,777 * 1/1995 Yuhara et al. .................... 235/379
5,555,172 * 9/1996 Potter ................................ 455/456
5,625,669 * 4/1997 McGregor et al. ............... 379/58
5,930,704 * 7/1999 Kay .................................. 455/419
6,058,304 * 5/2000 Callaghan et al. ............... 455/422

\* cited by examiner

*Primary Examiner*—Daniel Hunter
*Assistant Examiner*—Yemane Woldetatios
(74) *Attorney, Agent, or Firm*—Dilworth & Barrese, LLP

(57) ABSTRACT

A character recognition mobile telephone registers and performs various functions of the telephone using a character recognition function. The character recognition mobile telephone includes a function character storage for registering character codes corresponding to various functions of the mobile telephone; a touch screen with which a user inputs a desired function character; a character recognizer for generating feature data for the character input from the touch screen and a corresponding character code, and searching the function character storage for a character code identical to the generated character code; and a controller for entering a function mode corresponding to the input character.

14 Claims, 6 Drawing Sheets

MOBILE TELEPHONE HAVING A CHARACTER RECOGNITION FEATURE AND METHOD FOR CONTROLLING THE SAME

BACKGROUND OF THE INVENTION

1. Field of the Invention

The present invention relates to a mobile telephone with a character recognition function, and in particular, to a mobile telephone capable of registering and performing functions using a character recognition function, and a method for controlling the same.

2. Description of the Related Art

In general, mobile telephones have various functions, which can be selected by inputting a combination of input keys. However, due to the compactness of mobile telephones, the number of input keys are limited. This limitation creates an inconvenience to users trying to select among the various functions.

To solve this problem, a character recognition mobile telephone containing a touch screen has been proposed. However, in the conventional character recognition mobile telephone, the utility of the character recognition function is limited, for example, to character input for short message transmission. Accordingly, there has been a demand for a character recognition mobile telephone capable of handling the various functions of the telephone.

SUMMARY OF THE INVENTION

It is therefore an object of the present invention to provide a character recognition mobile telephone capable of registering and performing various functions using a character recognition function, and a method for controlling the same.

In accordance with one aspect of the present invention, a method for registering function characters in a mobile telephone includes the steps of: upon indication of an off-hook condition, entering a character recognition mode; upon receipt of a function character, selecting a corresponding one of several functions of the mobile telephone and displaying the received function character that matches the selected function; and registering the function character in association with the selected function, when a user inputs a registration key input in response to the displayed function character.

In accordance with another aspect of the present invention, a method is provided for recognizing function characters in a mobile telephone, where the mobile telephone includes a touch screen, a character code storage for storing character codes, a character recognizer, and a function character storage for storing character codes corresponding to functions of the mobile telephone. The method includes the steps of: upon an indication of an off-hook condition, entering a character recognition mode; recognizing touch screen data input from the touch screen using the character recognizer; reading a character code for the recognized character from the character code storage and displaying the read character code; searching the function character storage for a character code identical to the displayed character code, when the touch screen data input is completed; and entering a function mode associated with the character code, when the function character storage has a character code identical to the displayed character code.

In accordance with a further aspect of the present invention, a character recognition mobile telephone is provided which includes a function character storage for registering character codes corresponding to various function modes of the mobile telephone; a touch screen with which a user inputs a desired function character; a character recognizer for generating feature data for the character input from the touch screen and a corresponding character code, and searching the function character storage for a character code identical to the generated character code; and a controller for entering a function mode corresponding to the input character.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 1:
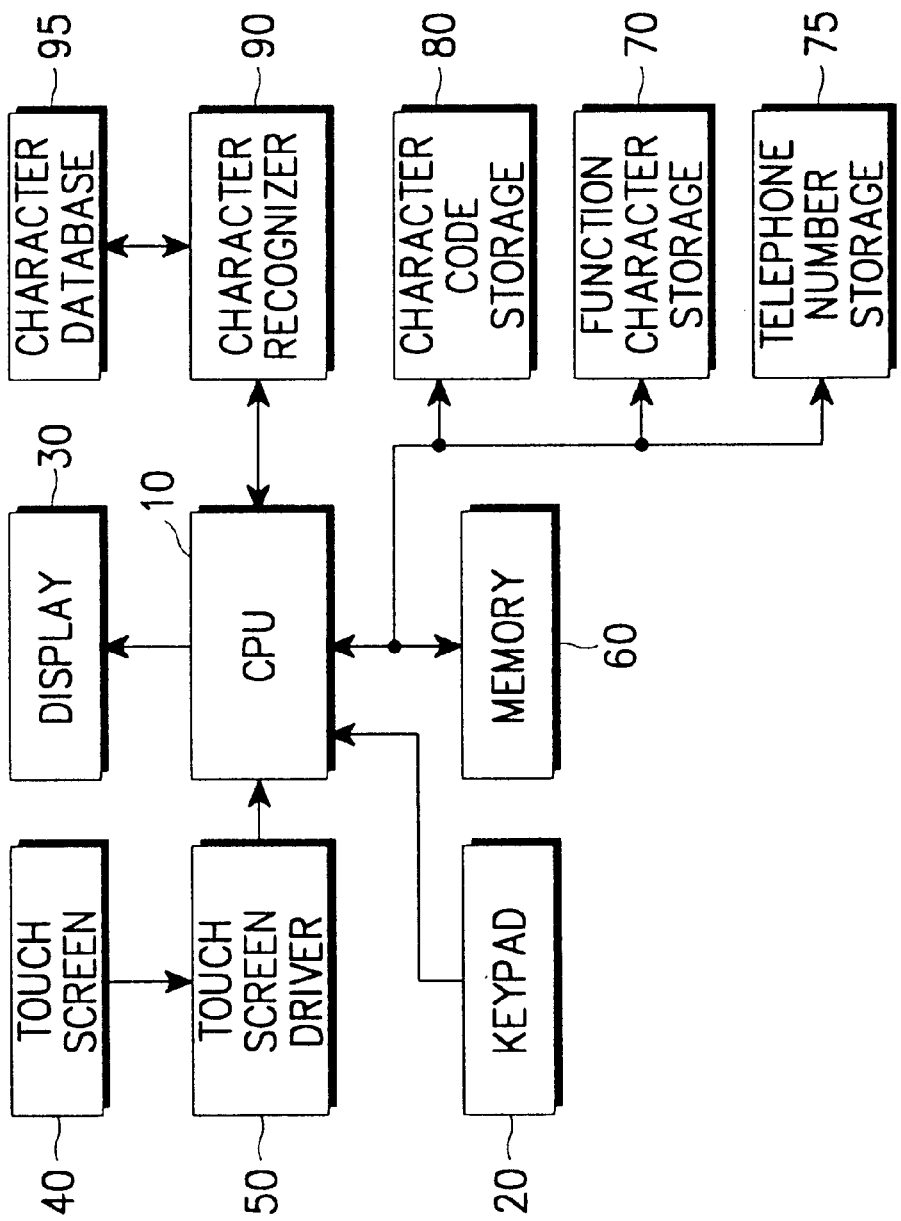
FIG. 1 is a block diagram of a character recognition mobile telephone according to an embodiment of the present invention.

FIG. 1 illustrates, in block diagram form, a character recognition mobile telephone according to an embodiment of the present invention, in which an RF (Radio Frequency) part and a DTMF (Dual Tone Multi-Frequency) part are not depicted in order to simplify the drawing.

Referring to FIG. 1, a central processing unit (CPU) 10, preferably a one-chip microprocessor, controls the overall operation of the mobile telephone and in particular, controls a character recognition function according to the present invention. A keypad input unit 20 has a keypad consisting of a plurality of numeric keys and at least one function key, and provides key data to the CPU 10 according to key operation of the user. A touch screen 40 recognizes a character input by the user by sensing a pressing point of the input character and outputs an x/y-coordinate signal and a stroke count signal of the character. The coordinate signal and the stroke count signal represent the position and movement of the pressing point of the input character. This combination of the coordinate signal and the stroke count signal is refered to hereinafter as a touch screen signal.

A touch screen driver 50 having an internal analog-to-digital (A/D) converter, converts the touch screen signal to digital touch screen data, and provides the digital touch screen data to the CPU 10, which in turn provides the data to a character recognizer 90. The character recognizer 90 calculates the coordinate and the stroke count of the input character and generates corresponding feature data according to a character recognition program. For example, for a character "A" having three strokes, the character recognizer 90 generates the feature data representing the coordinate and the stroke count, and searches a character database 95 for pre-registered feature data identical to the generated feature data within a permissible error range by comparing the generated feature data with the feature data previously registered in the character database 95. For example, the character database 95 has pre-registered feature data for the alphabetic characters and the Arabic numerals, registered previously therein. A character code storage 80 stores character codes corresponding to the respective pre-registered feature data stored in the character database 95. That is, upon receipt of the digital touch screen data from the touch screen driver 50, the character recognizer 90 generates the corresponding feature data, searches the character database 95 for the pre-registered feature data identical to the generated feature data and outputs an address for the searched pre-registered feature data to the CPU 10. Thereafter, the CPU 10 reads a character code from the character code storage 80 according to the input address, and displays a corresponding character on a display 30. In this manner, the character input through the touch screen 40 is displayed on the display 30.

The memory 60 is composed of a nonvolatile memory (e.g., flash memory or EEPROM) for storing a control program and initial service data, and a volatile memory (e.g., RAM) for temporarily storing data generated during execution of the program. Further, the memory 60 has a buffer for temporarily storing the character codes. The display 30, preferably an LCD, displays an operating state of the mobile telephone and in particular, displays the characters input through the touch screen 40 under the control of the CPU 10. A function character storage 70 stores function characters representing the respective functions of the mobile telephone and commands for entering the corresponding function modes. The function characters are composed of the character codes stored in the character code storage 80, and the length of the function characters is determined according to a panel size of the display 30 and the memory capacity of the mobile telephone. Upon reception of the commands, the CPU 10 calls a subroutine for the corresponding function stored in the memory 60. For example, the mobile telephone has various functions such as a redial function, a message read function, a setup function, a lock function, a phone book function, etc. For the phone book function, telephone number storage 75 is divided into a telephone number storage area for the telephone numbers and a name storage area for the names associated with the respective telephone numbers. In this embodiment, the phone book function is linked to the character recognition function.

Figure 2:
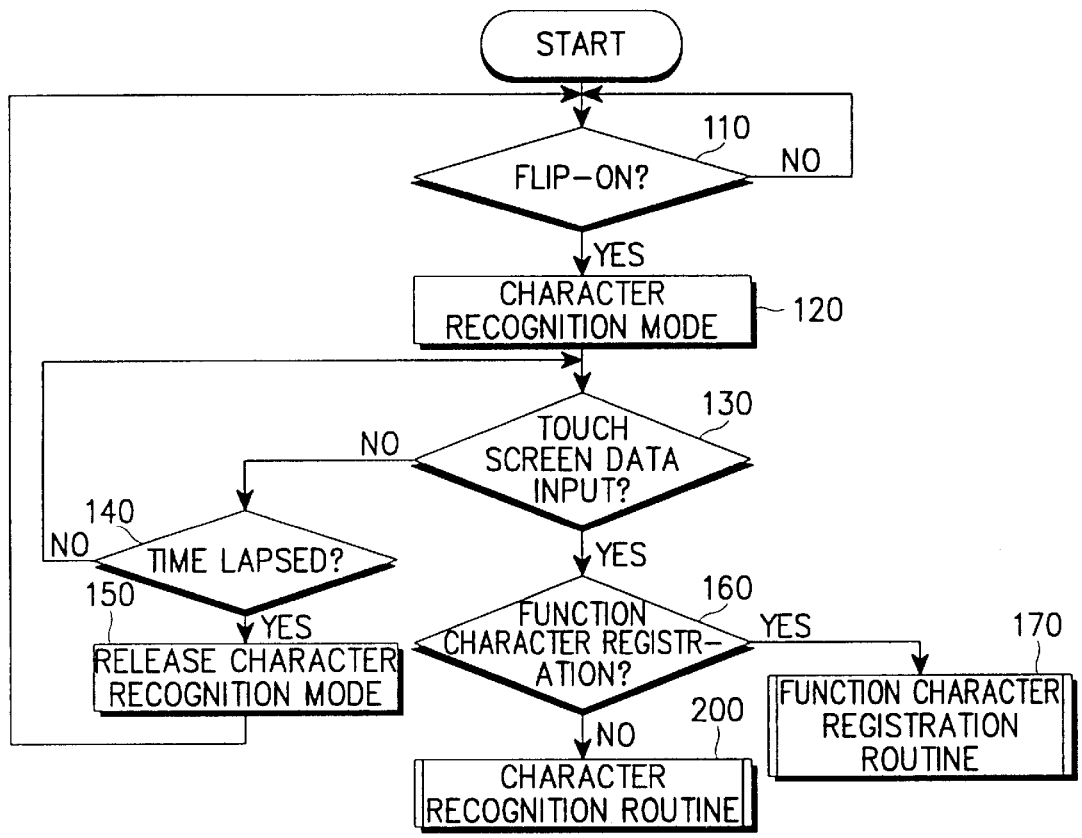
FIG. 2 is a flowchart illustrating an overall control procedure of the character recognition mobile telephone according to an embodiment of the present invention.

FIG. 2 is a flowchart illustrating an overall operation of the character recognition mobile telephone having a flip according to an embodiment of the present invention.

Referring to FIG. 2, when the user opens the flip of the mobile telephone in an idle state, the CPU 10 senses the flip-on state (i.e., off-hook state) in step 110 and enters a character recognition mode in step 120. Then, in step 130, the CPU 10 determines whether data input is received from the touch screen 40 or the key input unit 20. If the data input is not received, the CPU 10 determines whether a predetermined time has elapsed in step 140. If the predetermined time has not elapsed, the procedure returns to step 130. However, if the predetermined time has elapsed, the CPU 10 releases the character recognition mode in step 150 and then returns to step 110. Upon receipt of the input data from the touch screen 40 or the keypad 20 in step 130, the CPU 10 determines in step 160 whether the input data is for registering the function characters. If so, the CPU 10 performs in step 170 a subroutine for the function character registration, shown in FIGS. 3A and 3B and described hereinbelow. If not, the CPU 10 performs in step 200 a subroutine for the character recognition, shown in FIG. 4 and described below.

Figure 3A:
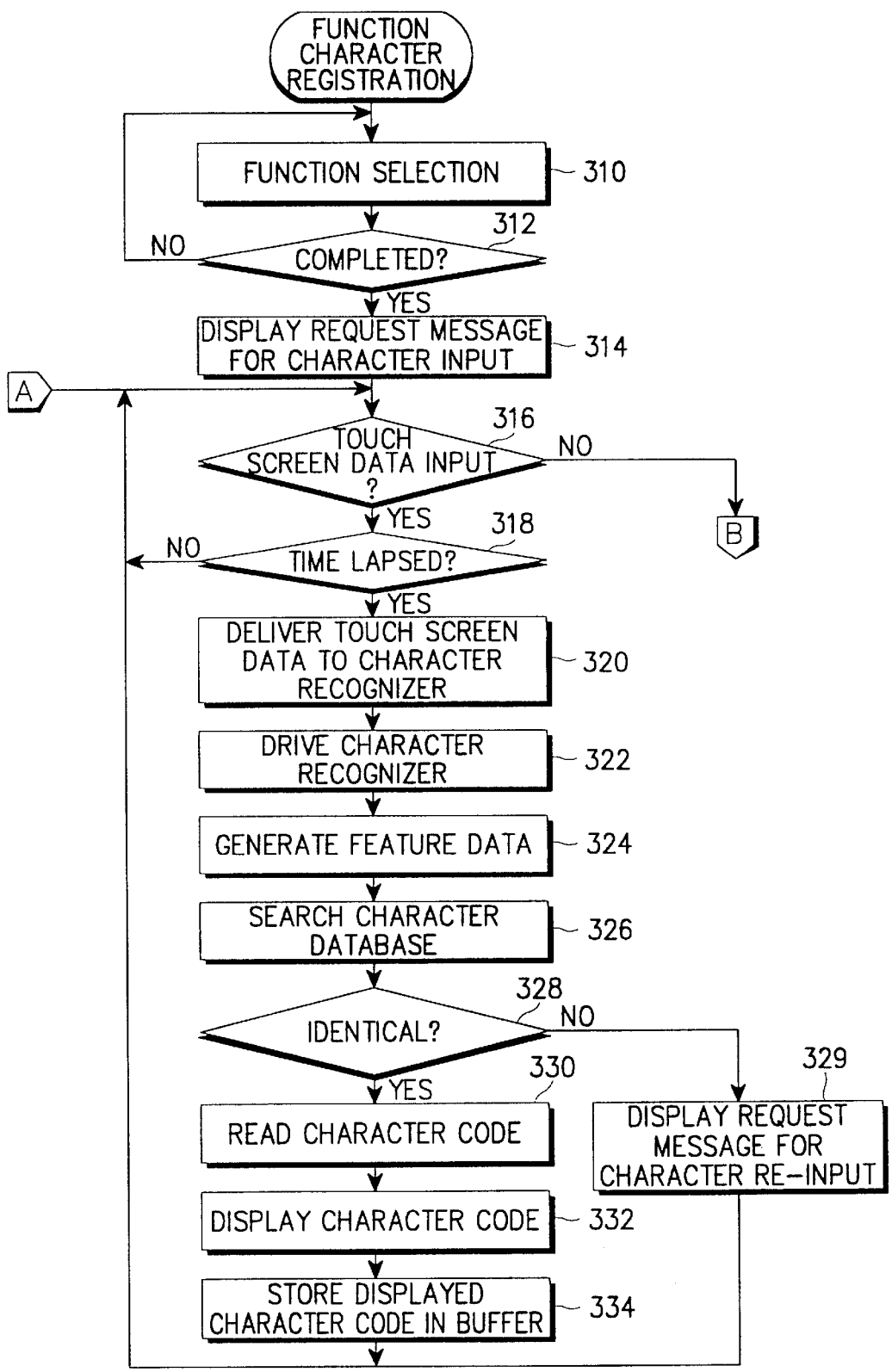
FIGS. 3A and 3B are flowcharts illustrating a function character registration procedure of the character recognition mobile telephone according to an embodiment of the present invention.
Figure 3B:
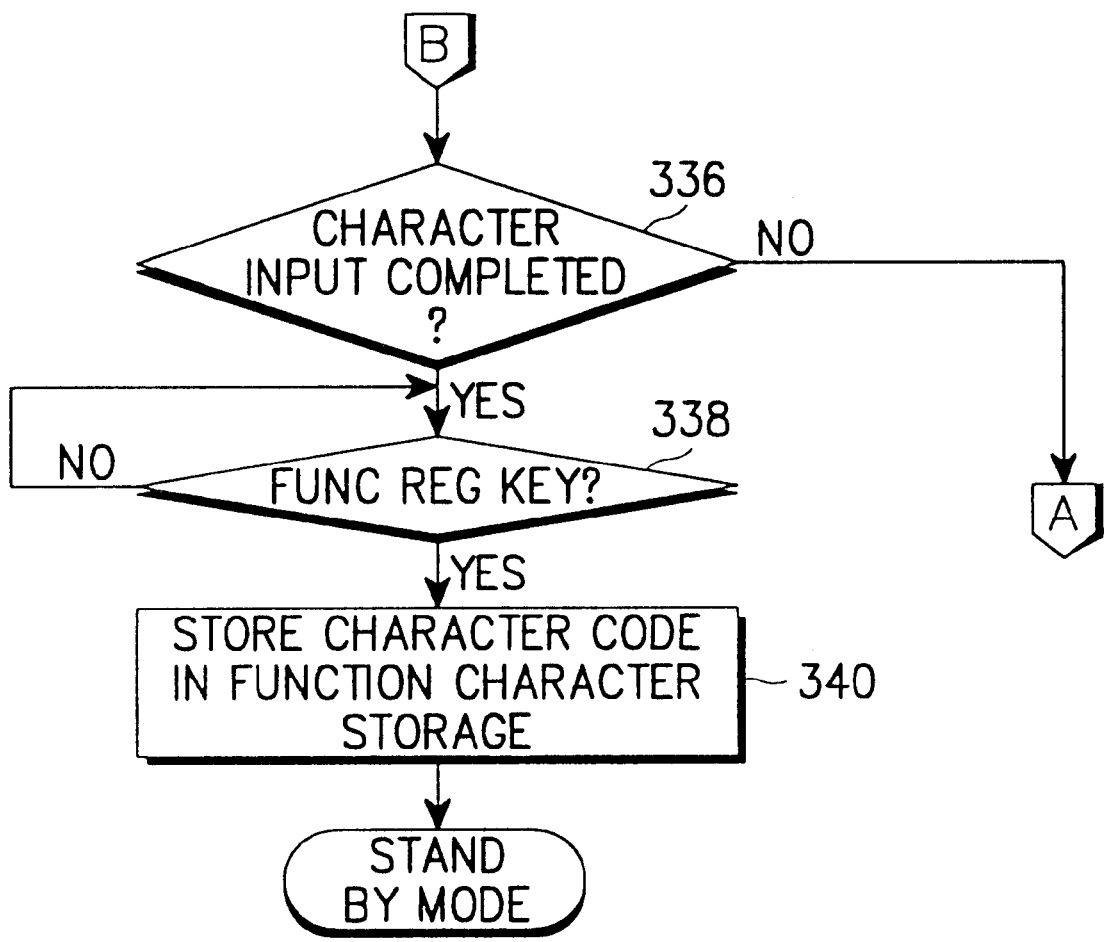

FIGS. 3A and 3B are flowcharts illustrating the subroutine for registering the function characters (Step 170 in FIG. 2) according to the present invention. Referring to FIGS. 3A and 3B, the user selects in step 310 a desired function using the character recognition function or the function key. When the function selection is completed in step 312, the CPU 10 displays on the display 30 a message requesting the user to input a desired character, in step 314. In answer to the request message, the user will input a character corresponding to the function selected in step 310 using the touch screen 40. The CPU 10 then determines in step 316 whether the user has input the character through the touch screen 40. If the touch screen signal is input from the touch screen 40, the CPU 10 checks in step 318 whether a predetermined time has elapsed to determine whether the user has finished inputting one character. When the predetermined time has elapsed, the CPU 10 delivers the touch screen data to the character recognizer 90, in step 320. The character recognizer 90 is then driven in step 322 and generates the feature data corresponding to the received touch screen data in step 324. As stated above, the feature data consists of the x/y-coordinate data and stroke counter data of the character input from the touch screen 40. Subsequently, the character recognizer 90 searches, in step 326, the character database 95 for the pre-registered feature data identical to the generated feature data. In step 328, the character recognizer 90 determines whether the character database 95 has the registered feature data identical to the generated feature data within a permissible range. If the character database 95 has the identical feature data, the character recognizer 95 reads the character code corresponding to the searched pre-registered feature data from the character code storage 80 in step 330, and then displays the character on the display 30 according to the read character code, in step 332. The displayed character code is stored in the buffer of the memory 60 in step 334. Thereafter, the procedure returns to the step 316 to determine whether other characters are input from the touch screen 40. The steps 316 to 334 are repeated until the user completes the character input.

Figure 5:
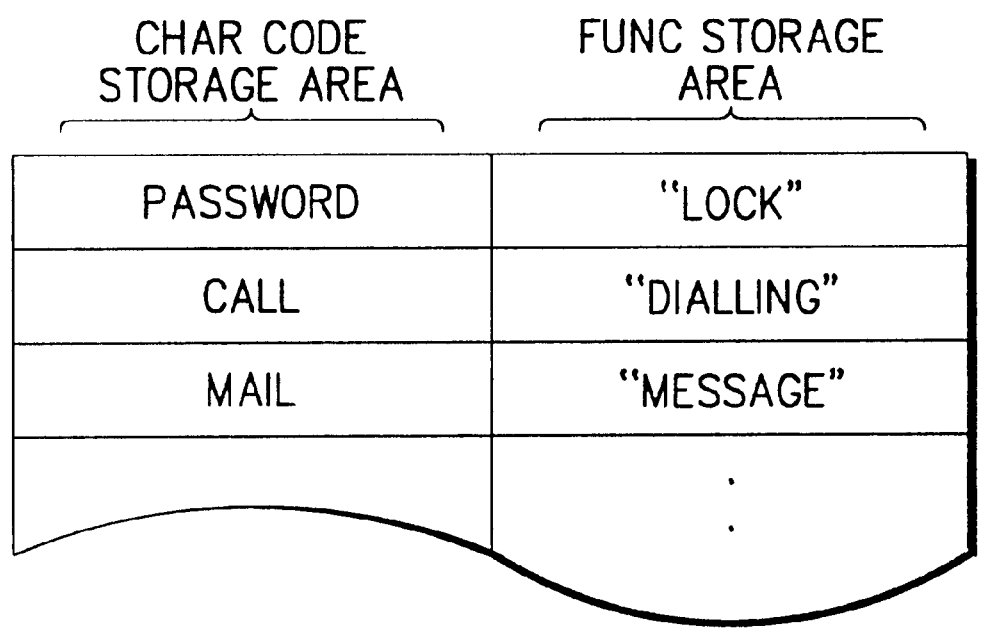
FIG. 5 is a memory map of a function character storage (70) of FIG. 1.

In the alternative, if it is determined in step 328 that the character database 95 does not have pre-registered feature data identical to the generated feature data, the CPU 10 displays on the display 30 a message requesting that the user re-input the character in step 329 and then returns to step 316. That is, when the character recognizer 90 fails to recognize the input character because the user inputs the character incorrectly, the CPU 10 requests that the user re-input the character. When the user finishes inputting the characters, if the CPU 10 senses in step 316 that the touch screen signal is not received from the touch screen 40, the CPU 10 then determines whether a character input end data is received or not, in step 336 of FIG. 3B. To generate the character input end data, the user may press a predetermined key on the keypad or touch a predetermined point on the touch screen 40. If the character input end data is received, the CPU 10 determines in step 338 whether a function registration key is input or not. If the function registration key is input, the CPU 10 stores, in the function character storage 70, the character code stored in the buffer and a command for entering the selected function mode, in step 340. As illustrated in FIG. 5, the function character storage 70 includes a character code storage area for storing the function characters input by the user and a function storage area for storing the commands for entering the function modes associated with the function characters. With continued reference to FIG. 3B, if the character input end data is not received in step 336, the CPU 10 returns to step 316.

Figure 4:
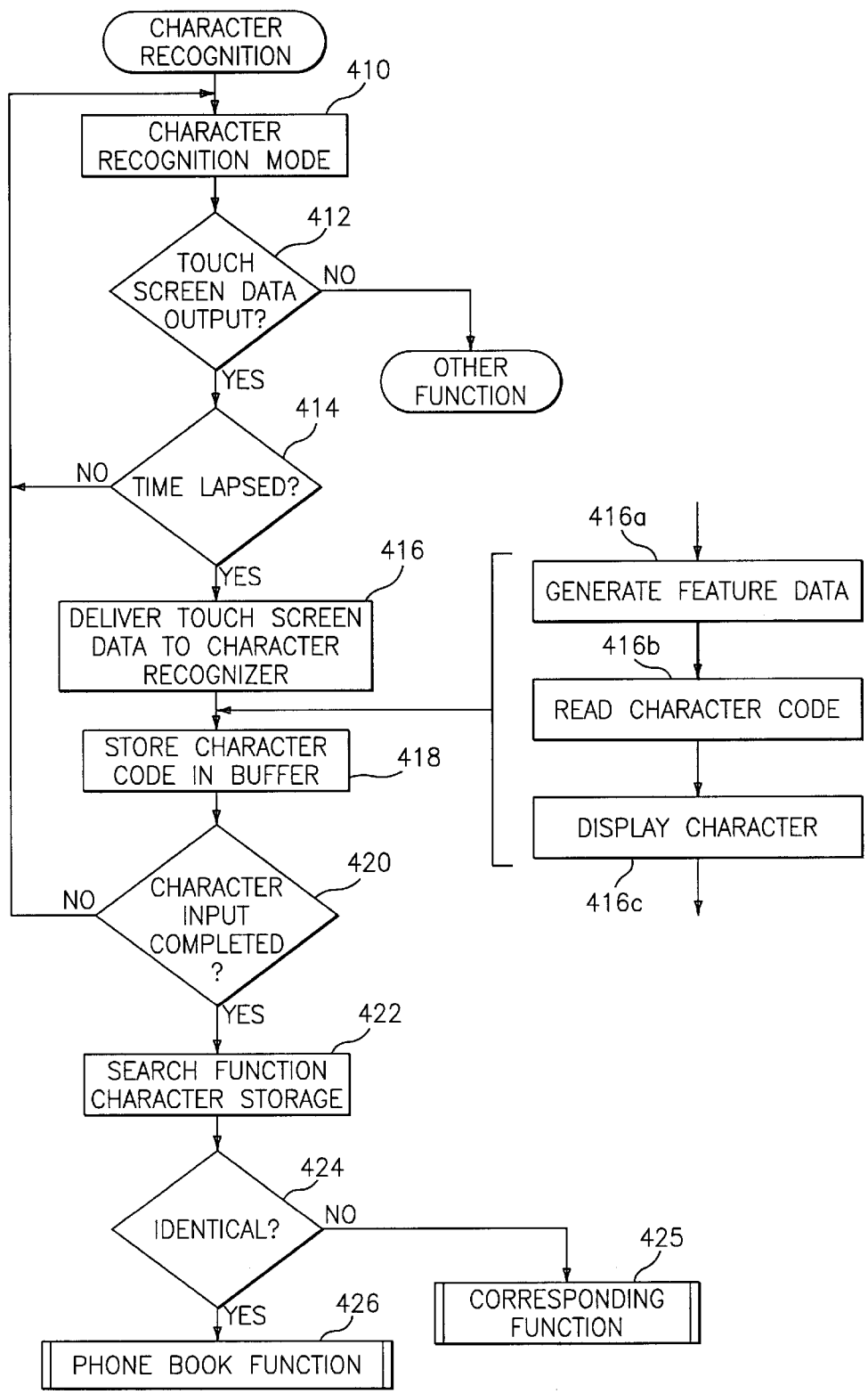
FIG. 4 is a flowchart illustrating a character recognition procedure of the character recognition mobile telephone according to an embodiment of the present invention.

FIG. 4 shows a character recognition subroutine (Step 200 of FIG. 2) according to an embodiment of the present invention. Referring to FIG. 4, the CPU 10 enters the character recognition mode in step 410, and determines in step 412 whether user data is received from the touch screen 40. When the user data is received, the CPU 10 determines in step 414 whether a predetermined time for which the user can input one character has elapsed or not. This predetermined time may be identical to the predetermined time in step 318. If the predetermined time has elapsed in step 414, the CPU 10 delivers in step 416 the touch screen data received from the touch screen 40 to the character recognizer 90. Upon receipt of the touch screen data, the character recognizer 90 generates the feature data in step 416a, reads the corresponding character code from the character code storage 80 in step 416b, and displays a character on the display 30 according to the read character code in step 416c. The displayed character code is stored in the buffer prepared in the memory 60, in step 418. The CPU 10 then checks in step 420 whether the character input is completed or not. If the character input is not completed, the CPU 10 retuns to step 410. If the character input is completed, the CPU 10 searches the function character storage 70 in step 422, and determines in step 424 whether the function character storage 70 has the character code identical to the character code stored in the buffer within the permissible error range. That is, the CPU 10 determines whether the character codes corresponding to the characters input by the user through the touch screen 40 are previously registered in the function character storage 70. If it is determined that the identical function character codes are detected from the function character storage 70, the CPU 10 calls a subroutine for entering the registered function mode corresponding to the detected function character codes in step 426. That is, the CPU 10 enters the corresponding function mode stored in the function character storage 70 and performs the corresponding function. For example, when the user registered characters "MAIL" for the message read function, he can call and use the message read function by inputting the characters "MAIL" through the touch screen 40. Alternatively, if the identical function characters are not detected from the function character storage 70 in step 424, the CPU 10 searches, in step 425, the telephone number storage 75 for a name having the character codes identical to the input characters, and displays and dials the searched telephone number, if any, on the display 30. This procedure is performed when the input characters correspond to the name during the phone book search.

In the present embodiment, the characters are input one by one, taking into consideration the panel size of the touch screen 40. However, when the panel of the touch screen 40 is large enough, it is possible to input more characters at once. Further, in this embodiment, ASCII codes are used for the character codes, and the characters displayed on the display 30 are composed of font data for the character codes. In this manner, the user can input the characters through the touch screen to use a desired function, instead of an annoying key manipulation, thereby conveniencing the user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for registering function characters in a mobile telephone, comprising the steps of:
   upon an indication of an off-hook condition, entering a character recognition mode;
   upon receipt of a function character, selecting a corresponding one of several functions of the mobile telephone and displaying the received function character that substantially matches the selected function; and
   registering the function character in association with the selected function, when a user inputs a registration key input in response to the displayed function character.

2. The method as recited in claim 1, wherein the mobile telephone has a flip and enters the character recognition mode upon detection of a flip-on state.

3. The method as recited in claim 1, further comprising the step of releasing the character recognition mode, if the function character is not received within a predetermined time while in the character recognition mode.

4. A method for recognizing function characters in a mobile telephone including a touch screen, a first character code storage for storing character codes, a character recognizer, and a second character storage for storing function character codes corresponding to functions of the mobile telephone, the method comprising the steps of:
   upon an indication of an off-hook condition, entering a character recognition mode;
   recognizing touch screen data input from the touch screen using the character recognizer to generate a recognized character corresponding to the input data, reading a character code corresponding to the recognized character from the first character code storage, and displaying the read character code;
   searching the second character storage for a pre-registered character code substantially identical to the displayed character code; and
   entering a function mode associated with the character code, when the second character storage has a character code identical to the displayed character code.

5. The method as recited in claim 4, further comprising the step of releasing the character recognition mode, if the touch screen data is not input within a predetermined time while in the character recognition mode.

6. The method as recited in claim 4, wherein the mobile telephone includes a telephone number storage for storing telephone numbers that match associated character codes, wherein if the second character storage does not have a pre-registered character code identical to the displayed character code, the mobile telephone searches the telephone number storage for a character code identical to the input character code and displays a telephone number associated with the searched character code.

7. The method as recited in claim 6, wherein the telephone number is automatically dialed upon indication of a match between the input character code and a stored character code.

8. A character recognition mobile telephone, comprising:
   a function character storage for pre-registering character codes corresponding to various function modes of the mobile telephone;
   a touch screen with which a user inputs a desired function character;
   a character recognizer for generating feature data and a corresponding character code for the character input via the touch screen, the character recognizer further searching the function character storage for a pre-registered character code substantially identical to the generated character code; and a controller for entering a function mode corresponding to the input character.

9. The character recognition mobile telephone as recited in claim 8, further comprising:

a telephone number storage for pre-registering character codes that match corresponding telephone numbers, wherein said controller displays a telephone number associated with the searched pre-registered character code.

10. The character recognition mobile telephone as recited in claim 9, wherein the controller dials the telephone number automatically upon indication of a match between a pre-registered character code and the generated character code.

11. A character recognition mobile telephone with character registration, comprising:

a touch screen with which a user inputs a function character corresponding to a function of the mobile telephone, thereby generating touch screen data;

a character recognizer to receive the touch screen data, which in turn generates feature data corresponding to the received touch screen data and searches a character database to find a pre-registered feature data substantially identical to the generated feature data; and a function character storage with a character code storage area for storing the function characters input by the user when the pre-registered feature data is not substantially identical to the generated feature data.

12. A character recognition mobile telephone with character registration as recited in claim 11, wherein said character recognizer includes timing means having a predetermined time period within which the user must input the function character via the touch screen, where after said time period expires the touch screen data is automatically delivered to the character recognizer.

13. A character recognition mobile telephone with character registration as recited in claim 11, wherein the feature data consists of an x/y-coordinate data and a stroke counter data.

14. A character recognition mobile telephone with character registration as recited in claim 12, wherein the feature data consists of an x/y-coordinate data and a stroke counter data.

* * * * *